US012578883B2

(12) United States Patent
Parmar et al.

(10) Patent No.: US 12,578,883 B2
(45) Date of Patent: Mar. 17, 2026

(54) ELASTIC EXTERNAL STORAGE FOR DISKLESS HOSTS IN A CLOUD

(71) Applicant: VMware LLC, Palo Alto, CA (US)

(72) Inventors: Piyush Hasmukh Parmar, Pune (IN); Amrita Shivananda Hegde, Siddapura (IN); Gabriel Tarasuk-Levin, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 11 days.

(21) Appl. No.: 18/649,447

(22) Filed: Apr. 29, 2024

(65) Prior Publication Data

US 2025/0335110 A1     Oct. 30, 2025

(51) Int. Cl.
G06F 3/00          (2006.01)
G06F 3/06          (2006.01)
(52) U.S. Cl.
CPC .......... G06F 3/0631 (2013.01); G06F 3/0604 (2013.01); G06F 3/067 (2013.01)
(58) Field of Classification Search
CPC ....... G06F 3/0631; G06F 3/0604; G06F 3/067
See application file for complete search history.

(56) References Cited

U.S. PATENT DOCUMENTS

| | | | |
|---|---|---|---|
| 11,861,413 B2 | 1/2024 | Kamat et al. | |
| 2019/0227845 A1* | 7/2019 | Sridhar ................ | G06F 9/5044 |
| 2020/0026580 A1* | 1/2020 | Bahramshahry ...... | G06F 9/5077 |
| 2020/0183720 A1* | 6/2020 | Dai ......................... | G06F 3/061 |

* cited by examiner

*Primary Examiner* — Craig S Goldschmidt
(74) *Attorney, Agent, or Firm* — Kim & Stewart LLP

(57)          ABSTRACT

An example method of managing external storage for a software-defined data center (SDDC) executing in a cloud is described. The method includes receiving, at a storage manager from the SDDC, requests to consume capacity of the external storage, the external storage allocated for the SDDC according to a cloud subscription; determining, by the storage manager based on a batch of the requests in combination, an amount by which to expand a current capacity of the external storage to a target capacity comprising a sum of an expanded capacity and the current capacity; executing, by the storage manager in cooperation with a storage server of the external storage, a first activity to obtain the target capacity of the external storage; and sending, from the storage manager to the SDDC, at least one identifier that enables software executing in the SDDC to use the expanded capacity for the batch of requests.

20 Claims, 8 Drawing Sheets

100

100

104

218

Diskless Hosts 106

Software 224

Customer Software 116

Virt. Support Software 246

VMs 236        Containers 238

Hypervisor 228        SDN Layer 275

Hardware Platform 222

CPU(s) 260

RAM 262

NIC(s) 264

108

Diskless Hosts 106M

Management Software 114

Virt. Mgmt. Server(s) 281

Network Mgmt. Server(s) 282

Migration Manager 284

LCM 286

ESGs 288

600

Select a release request from request store — 602

Determine capacity freed from release and add to available capacity — 604

Perform release per release request — 606

Assign release activity to worker service that cooperates with storage server — 608

Maintain status for release request — 610

800

900

1000

ELASTIC EXTERNAL STORAGE FOR DISKLESS HOSTS IN A CLOUD

BACKGROUND

Customers can obtain diskless host subscriptions from cloud providers (also known as diskless instances or diskless servers). A diskless host subscription includes access to hosts that do not have local storage devices, such as solid-state drives (SSDs), hard disk drives (HDDs), and the like. With a diskless host subscription, customers cannot store their persistent data on the hosts or using any type of aggregated storage across the hosts since the hosts are "diskless." Rather, customers can store their persistent data using external storage accessible over the network. For example, customers can obtain subscriptions to cloud-based block storage, cloud-based file storage, or the like.

A customer with a diskless host subscription can obtain another subscription from a vendor to provision a software-defined data center (SDDC) on the diskless hosts (e.g., via an Infrastructure-as-a-Service (IaaS) subscription). The IaaS subscription provisions hypervisors on the hosts and provides management software for managing virtualization of the diskless hosts, underlying network, and underlying storage. Management software can include virtualization managers, network managers, network edge servers, container orchestration controllers, and the like. The customer can then deploy their workloads in the SDDC. The management software requires persistent storage. Since the customer's subscription in the cloud is to diskless hosts, the management software of the SDDC cannot leverage local storage on the hosts. Rather, similar to the customer's persistent data, the management software can store its persistent data using cloud-based storage accessible over the network. There are, however, some challenges with this approach.

The storage capacity required by the management software can vary depending on the types of management software deployed and the features of the management software that are enabled. Moreover, the management software types and enabled/disabled features can vary over the lifetime of the SDDC. One solution is to just over-provision storage capacity to support a worst case or near-worst case scenario of all or most management software types and features. This solution, however, is not cost effective for the customer. The customer is forced to pay for storage capacity that is unused by and, in some cases, may never be used by the management software of the SDDC. There is a need for a more elastic solution for external storage used by management software of an SDDC provisioned on diskless hosts in a cloud.

SUMMARY

In an embodiment, a method of managing external storage for a software-defined data center (SDDC) executing in a cloud is described. The method includes receiving, at a storage manager executing in the cloud from the SDDC, requests to consume capacity of the external storage, the external storage allocated for the SDDC according to a subscription to the cloud. The method includes determining, by the storage manager based on a batch of the requests in combination, an amount by which to expand a current capacity of the external storage to a target capacity comprising a sum of an expanded capacity and the current capacity. The method includes executing, by the storage manager in cooperation with a storage server of the external storage, a first activity to obtain the target capacity of the external storage. The method includes sending, from the storage manager to the SDDC, at least one identifier that enables software executing in the SDDC to use the expanded capacity for the batch of requests.

Further embodiments include a non-transitory computer-readable storage medium comprising instructions that cause a computer system to carry out the above method, as well as a computer system configured to carry out the above method.

DETAILED DESCRIPTION

Techniques for managing external storage for a software-defined data center (SDDC) executing in a cloud are described. An SDDC may be a data center where the infrastructure elements, e.g., compute, networking, storage, etc., are virtualized. In embodiments, a storage manager executes in the cloud and provides a service to one or more SDDCs. For a given SDDC, the storage manager receives requests to consume capacity of external storage in the cloud, where the external storage is allocated to the SDDC according to a subscription to the cloud. For example, in embodiments, the SDDC executes on hosts that are diskless and do not include local storage devices. Rather, the SDDC makes use of the external storage for storing its persistent data. In embodiments, the requests received at the storage manager are from management software executing in the SDDC. The storage manager is configured to batch grow requests and determine an amount by which to expand a current capacity of the external storage. The storage manager is also configured to release capacity back to a pool of available capacity in response to release requests. The storage manager cooperates with a storage server of the external storage to execute an activity to obtain a target capacity of the external storage based on the batch of grow requests. For example, in embodiments, the storage manager batches grow requests during a cool-off period implemented by the external storage during which no capacity expansion can be performed. The techniques described herein keep track of various storage expansion and release requests for management software of an SDDC and effectively grow the external storage capacity only by the minimum request required. This is done with the intent to minimize storage costs for the cloud offering. These and further aspects of the techniques are described below with respect to the drawings.

Figure 1:
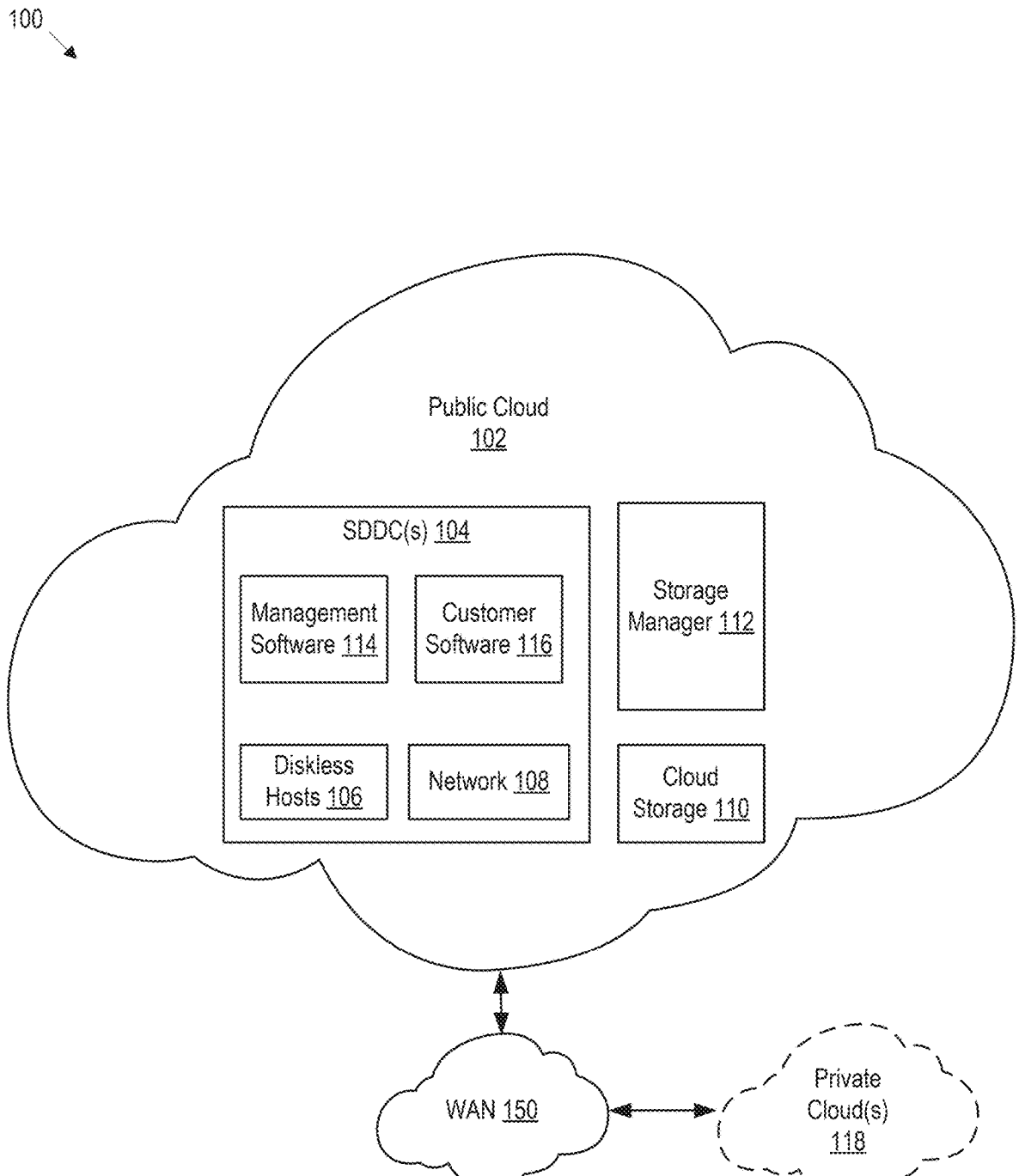
FIG. 1 is a block diagram depicting a computing system according to embodiments.

FIG. 1 is a block diagram depicting a computing system 100 according to embodiments. Computing system 100 includes a public cloud 102 accessible over a wide area network (WAN) 150, such as the public Internet. Public cloud 102 is managed by a cloud provider. Example public clouds include AMAZON WEB SERVICES, MICROSOFT AZURE, and GOOGLE CLOUD. A customer obtains subscriptions from the cloud provider for access to public cloud 102. In embodiments, a customer obtains a subscription from cloud provider for access to diskless hosts 106. A diskless host may be a computer constructed on a hardware platform having conventional computing circuits and devices except for usable local storage devices. Local storage devices are devices that can store data persistently (i.e., retain data even when the devices are unpowered). For example, the hardware platform of a diskless host includes a central processing unit (CPU), system memory (e.g., volatile random-access memory (RAM)), network interface card(s) (NIC(s)), and the like, but does not include a solid-state drive (SSD), a hard disk drive (HDD), a hybrid drive, a flash drive, or the like type of usable local storage device. Note that a computer can include some nonvolatile memory that can store data persistently for firmware, configuration data, and the like (e.g., read-only memory (ROM), electrically erasable programmable read-only memory (EEPROM), non-volatile RAM (NVRAM), or the like). The term local storage device, as used herein, does not encompass such nonvolatile memories that a computer may use to store firmware or other configuration data for its hardware platform. Further, a diskless host may include a local storage device that is unusable (e.g., not capable of being used by customers in a subscription, nonfunctional, etc.) and still remain "diskless" as used herein.

Figure 2:
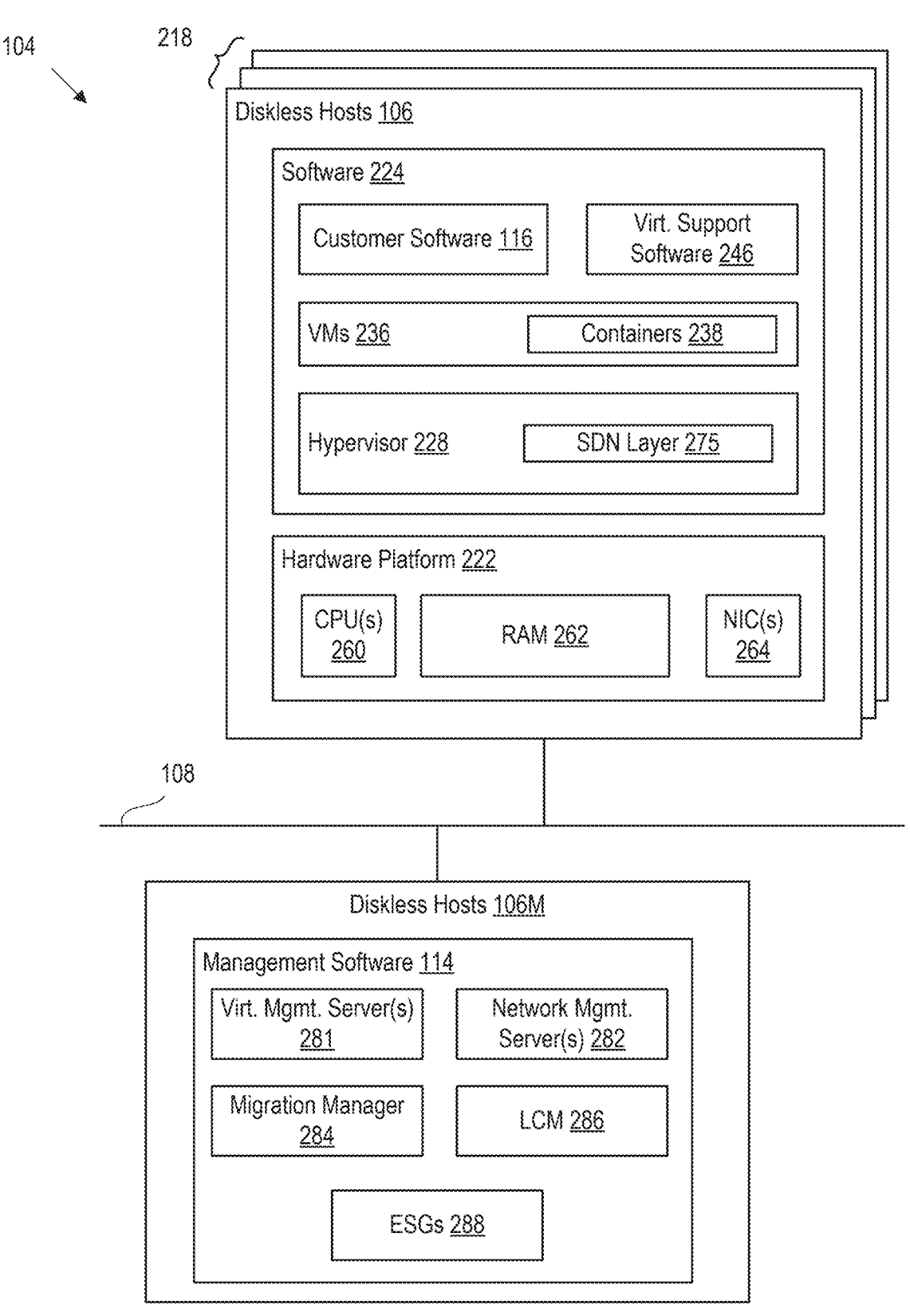
FIG. 2 is a block diagram depicting an SDDC according to embodiments.

Diskless hosts 106 are connected to a network 108 of public cloud 102, which enables network communication with each other and with other devices either in public cloud 102 or external to public cloud 102 via WAN 150. The customer obtains a subscription from a vendor (which can be the same or different from the cloud provider) for an Infrastructure-as-a-Service (IaaS) that deploys a software-defined data center (SDDC) implemented using diskless hosts 106 and network 108. That is, a software vendor provides IaaS subscriptions to customers to consume public cloud hosts and create SDDCs. The customer can procure one or more of such SDDCs from the vendor. In addition, the vendor may have multiple customers and can deploy multiple SDDCs that use diskless hosts 106 and network 108 across the multiple customers. An example SDDC 104 is shown in FIG. 2.

The customer can obtain a subscription from the cloud provider for cloud storage 110. Cloud storage 110 is storage for persistent data that is accessible by hosts, including diskless hosts 106, over network 108. Cloud storage 110 can include block-based cloud storage, file-based cloud storage, or the like. The customer can obtain subscription(s), each for some capacity of cloud storage 110, to store persistent data for SDDC 104. Cloud storage 110 can be referred to herein as "external storage," as cloud storage 110 includes storage devices that are external to diskless hosts 106.

SDDC 104 includes customer software 116 and management software 114. Customer software 116 comprises any of a myriad of applications, services, and the like deployed by the customer in its SDDC 104 (sometimes referred to herein as "customer workloads"). Customer software 116 is software deployed by the customer in an SDDC. Management software 114 is software deployed by the vendor as part of the IaaS subscription to manage virtualization of diskless hosts 106 and network 108. Virtualization includes hypervisors installed on diskless hosts 106 that support virtual machines (VMs) and containers, as well as software-defined networks (SDNs) that virtualize network 108.

Customer software 116 can store some persistent data in cloud storage 110. In addition, management software 114 requires some capacity of cloud storage for storing its persistent data. In embodiments, the vendor provides storage manager 112 for managing capacity in cloud storage 110 consumed by management software 114 of each SDDC 104. Storage manager 112 comprises software executing in public cloud 102 accessible via network 108. Storage manager 112 can serve one customer or multiple customers (e.g., multi-tenant). Operation of storage manager 112 is described below.

In embodiments, a customer can operate a private cloud 118. A private cloud 118 is a data center where the customer operates and/or is responsible for the hardware and software thereof. A private cloud 118 can cooperate with SDDC(s) 104 in public cloud 102 via WAN 150 as part of a hybrid cloud. A hybrid cloud is a cloud that includes both public cloud and private cloud components. Private cloud 118 is optional and a customer's environment can include only SDDC(s) 104 in public cloud 102.

FIG. 2 is a block diagram depicting an SDDC 104 according to embodiments. SDDC 104 includes software 224 executing on diskless hosts 106 and management software 114 executing on diskless hosts 106M. Software 224 executes on cluster(s) 218 of diskless hosts 106, each of which may be constructed on hardware platforms such as x86 architecture platforms or ARM platforms. For purposes of clarity, only one host cluster 218 is shown. However, SDDC 104 can include many of such host clusters 218. As shown, a hardware platform 222 of each diskless host 106 includes conventional components of a computing device, such as one or more central processing units (CPUs) 260, system memory (e.g., random access memory (RAM) 262), one or more network interface controllers (NICs) 264. As discussed above, diskless hosts 106 do not include local storage. CPUs 260 are configured to execute instructions, for example, executable instructions that perform one or more operations described herein, which may be stored in RAM 262. NICs 264 enable host 106 to communicate with other devices through network 108.

Software 224 of each diskless host 106 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed. Software executes in VMs 236 either directly on guest operating systems of VMs 236 or using containers 238. Containers 238 implement operating system-level virtualization, where an abstraction layer is provided on top of a guest operating system of a VM 236. While the embodiment shows containers executing in VMs 236, some hypervisors support the execution of containers outside of a virtual machine environment.

Hypervisor 228 includes SDN layer 275. SDN layer 275 virtualizes network 108 and NICs 264 to implement SDNs. SDN layer 275 includes distributed software (across hypervisors 228), such as distributed switches, distributed routers, and the like. SDN layer 275 can cooperate with software executing in VMs 236, such as network control planes, service routers, and the like to implement SDNs.

Software executing in VMs 236 (within containers or directly on guest operating systems) includes customer software 116 and virtualization support software 246. Virtualization support software 246 includes software, deployed in host cluster 218 by management software 114, which supports virtualization of resources in SDDC 104, container orchestration servers (e.g., KUBERNETES or the like), network controllers, load balancers, firewalls, and the like.

Management software 114 includes, for example, virtualization management server(s) 281, network management server(s) 282, migration manager 284, lifecycle manager (LCM) 286, edge services gateway(s) (ESG(s)) 288. Virtualization management server 281 manages hypervisors 228 in diskless hosts 106 of host cluster 218. Virtualization management server 281 installs agent(s) in hypervisor 228 to add a host as a managed entity. Virtualization management server 281 can logically group diskless hosts 106 into host cluster 218 to provide cluster-level functions, such as VM migration, distributed power management, dynamic VM placement according to affinity and anti-affinity rules, and high-availability, among other functions. Virtualization management server 281 can manage more than one host cluster 218.

Network management server 282 orchestrates and manages a software defined network (SDN) layer 275. Network management server 282 installs additional agents in hypervisor 228 to add a host as a managed entity. Network management server 282 can configure SDN layer 275 in hypervisor 228 (e.g., to implement logical switches, logical routers, etc.) and can deploy virtualization support software 246 (e.g., load balancers, firewalls, etc.). In other embodiments, SDN layer 275 is orchestrated and managed by virtualization management server 281 without the presence of network manager 282. Network management server 282 can deploy one or more ESGs 288 to provide network edge services for SDDC 104 (e.g., gateways, firewalls, etc.).

Migration manager 284 can be stand-alone software or a part of virtualization management server 281 (e.g., a feature of virtualization management server 281). Migration manager 284 controls migration of VMs between diskless hosts 106 and/or between a customer's private cloud 118 and SDDC 104. LCM 286 can be stand-alone software or a part of virtualization management server 281 (e.g., a feature of virtualization management server 281). LCM 286 controls lifecycle operations of SDDC 104, such as deploying software, upgrading software, removing software, performing software maintenance, etc. FIG. 2 shows some examples of management software and/or features of management software and management software 114 can include other software/features that manage virtualization, which are known in the art, but not specifically shown.

One or more components of management software 114 require persistent storage to function. As diskless hosts 106 do not include local storage devices, in embodiments, management software 114 consumes capacity in cloud storage 110 provided by a subscription to public cloud 102. A given IaaS subscription that deploys SDDC 104 can have a maximum storage capacity that would be consumed by a maximum number of management server instances and enabled features. The customer, however, often deploys less than the maximum supported instances of management servers and features and thus less capacity of cloud storage 110 is needed in support. Throughout the lifespan of SDDC 104, the customer may deploy additional instances of management software and/or additional features that require additional storage capacity. In embodiments, SDDC 104 cooperates with storage manager 112 to obtain storage capacity for management software 114, to expand (also referred to as grow) storage capacity when needed, and to release used storage capacity to the free pool of storage capacity (referred to as available capacity). The capacity in cloud storage 110 consumed by management software 114 is elastic and capable of growing or shrinking over the lifespan of SDDC 104.

Figure 3:
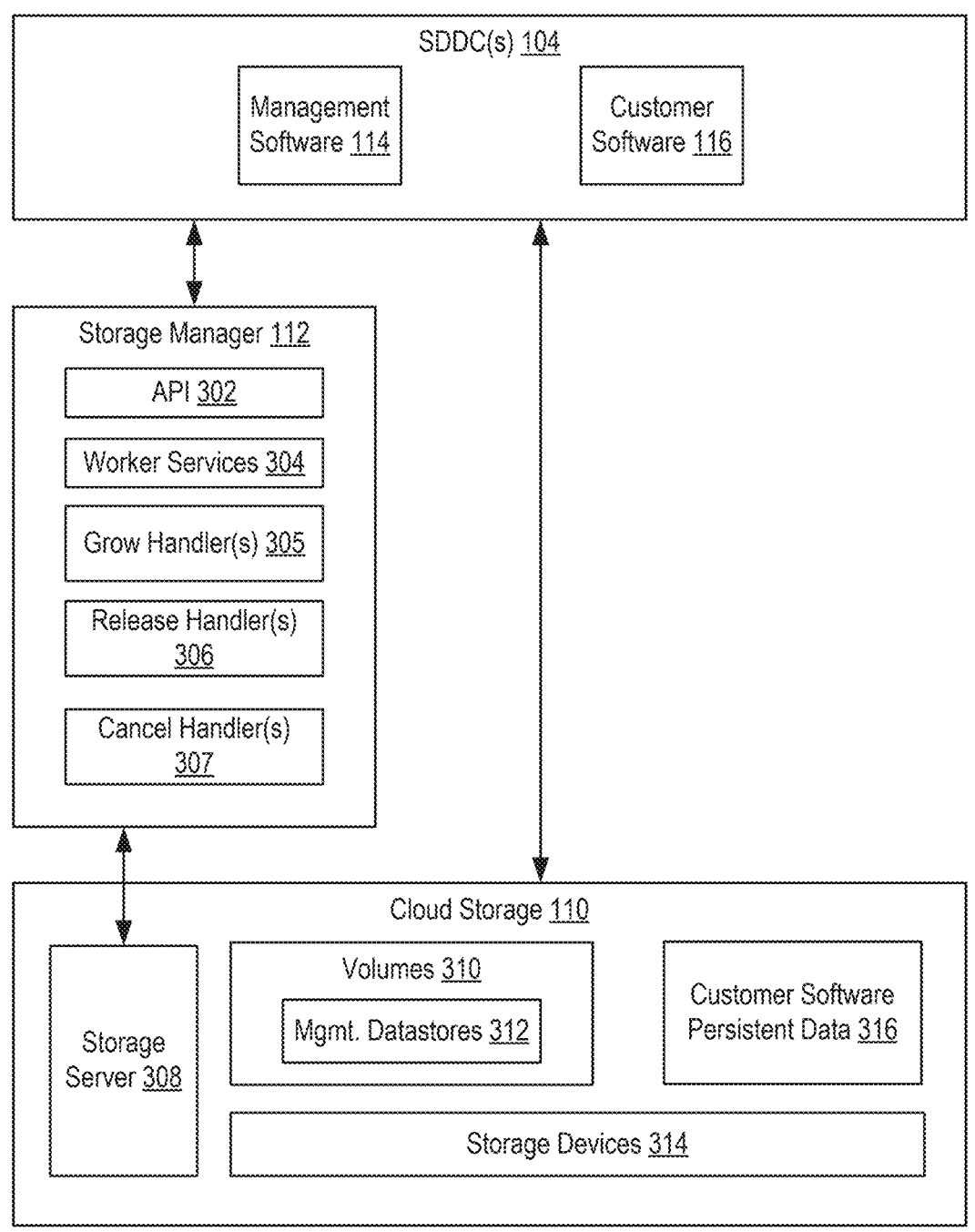
FIG. 3 is a block diagram depicting a storage subsystem for SDDC(s) using diskless hosts according to embodiments.

FIG. 3 is a block diagram depicting a storage subsystem for SDDC(s) using diskless hosts according to embodiments. In some embodiments, customer software 116 may require some persistent storage. In such case, the customer can obtain a subscription from the cloud provider for some capacity in cloud storage 110 for storing customer software persistent data 316. In other embodiments, customer software 116 may require no persistent storage and thus no customer software persistent data 316 is stored in cloud storage 110. If storage capacity is needed for customer software 116, the customer can obtain the necessary subscription for the storage capacity external to the IaaS subscription for SDDC(s) 104 and such storage capacity is not managed by storage manager 112. Rather, storage manager 112 manages only the storage capacity needed for management software 114. The customer has a subscription from the cloud provider for the capacity needed to support management software 114 ("management storage subscription").

Storage manager 112 includes an application programming interface (API) 302, worker services 304, grow release handler(s) 305, release handler(s) 306, and cancel handler(s) 307. API 302, grow handler(s) 305, release handler(s) 306, and cancel handler(s) 307 are meant to illustrate different functionalities of storage manager 112 for purposes of explanation and not to limit the software structure of storage manager 112 in terms of specific routines, functions, threads, processes, and the like. Worker services 304 encompass different routines, functions, threads, processes, services, or the like that execute concurrently to handle activities of storage manager 112.

Cloud storage 110 includes a storage server 308 that manages volumes 310 on storage devices 314. Management software 114 stores management datastores 312 on volumes 310 for its persistent data. A volume 310 is a storage area that is formatted with a file system. A management datastore 312 is a logical container that abstracts specifics of the underlying physical storage for use by VMs. Storage manager 112 cooperates with storage server 308 to obtain capacity on storage devices 314 and to allocate volumes 310 in available capacity for use in storing management datastores 312.

SDDC 104 interacts with storage manager 112 using API 302. SDDC 104 can send requests through API 302, including requests to grow capacity, release capacity, cancel a previous request, and obtain status of a request. Grow handler(s) 305 process grow capacity requests. A grow capacity request is a request, from management software of SDDC 104, to consume capacity of the management subscription of a specified amount (e.g., measured in bytes). An SDDC 104 sending a grow request is agnostic to whether an expansion of the current capacity is necessary or whether there is enough available capacity. Release handler(s) 306 process release capacity requests. A release capacity request is a request, from SDDC 104, to free a portion of the current capacity that was previously in use by management software 114. This typically occurs when the customer no longer requires an instance of management software or when an instance of management software no longer has these storage requirements (e.g., disabled features). Cancel handler(s) 307 process cancel requests. A cancel request is a request, from SDDC 104, to cancel a previously sent grow request or release request.

Storage manager 112 can assign activities for executing requests to worker services 304. Storage manager 112 can include grow handlers 305, release handlers 306, and cancel handlers 307 per SDDC 104 or per customer. Alternatively, a grow handler 305, a release handler 306, and a cancel handler 307 can be multi-tenant and service multiple customers. Storage manager 112 can execute multiple worker services 304 in parallel to perform concurrent activities associated with requests.

Storage server 308 can allocate volumes 310 on storage devices 314 within the current capacity of the management storage subscription. Storage server 308 can grow the current capacity from a first capacity to a second capacity larger than the first capacity. Once storage server 308 has initiated a grow operation to increase capacity of the subscription, there can be a cool-off period during which storage server 308 will not perform any further grow operations. The cool-off period allows time for cloud storage 110 to complete a grow operation (e.g., allocating new capacity on storage devices 314). As described further below, storage manager 112 batches grow requests during the cool-off period.

Figure 4:
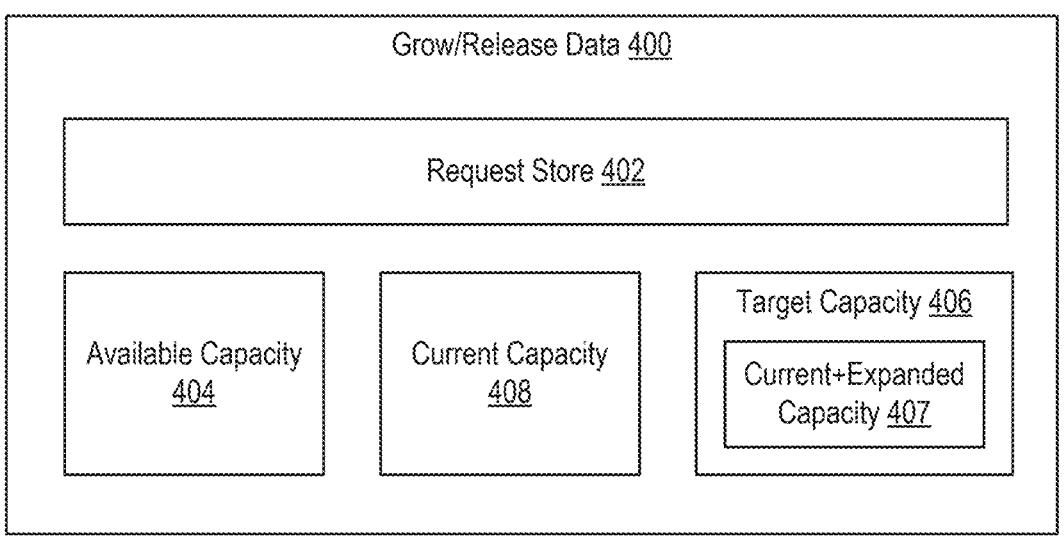
FIG. 4 is a block diagram depicting grow/release data used by storage manager according to embodiments.

FIG. 4 is a block diagram depicting grow/release data 400 used by storage manager 112 according to embodiments. Grow/release data 400 includes a request store 402. API 302 receives grow requests and release requests from an SDDC 104 and stores them in request store 402. Storage manager 112 can include a request store 402 for each SDDC 104. Request store 402 can be any type of collection-based data structure. In embodiments, request store 402 is a queue. Storage manager 112 processes requests in request store 402 as described below, including batching of grow requests during the cool-off period.

Storage manager 112 can maintain a current capacity 408 of the management storage subscription. Storage manager 112 can also maintain an available capacity 404. Available capacity 404 is that capacity of current capacity 408 that is available or free for storage of management datastores. Storage manager 112 can maintain available capacity 404 based on release requests. Storage manager 112 can also periodically verify available capacity 404 with storage server 308. As grow requests are processed, and expansion of current capacity 408 is necessary, storage manager 112 maintains a target capacity 406. Target capacity 406 can be a sum 407 (e.g., in bytes) of current capacity 408 and an expanded capacity. For example, current capacity 408 can be X Terabytes (TB), grow requests can require an additional Y TB of capacity (expanded capacity), and target capacity 406 can be X+Y TB.

Figure 5:
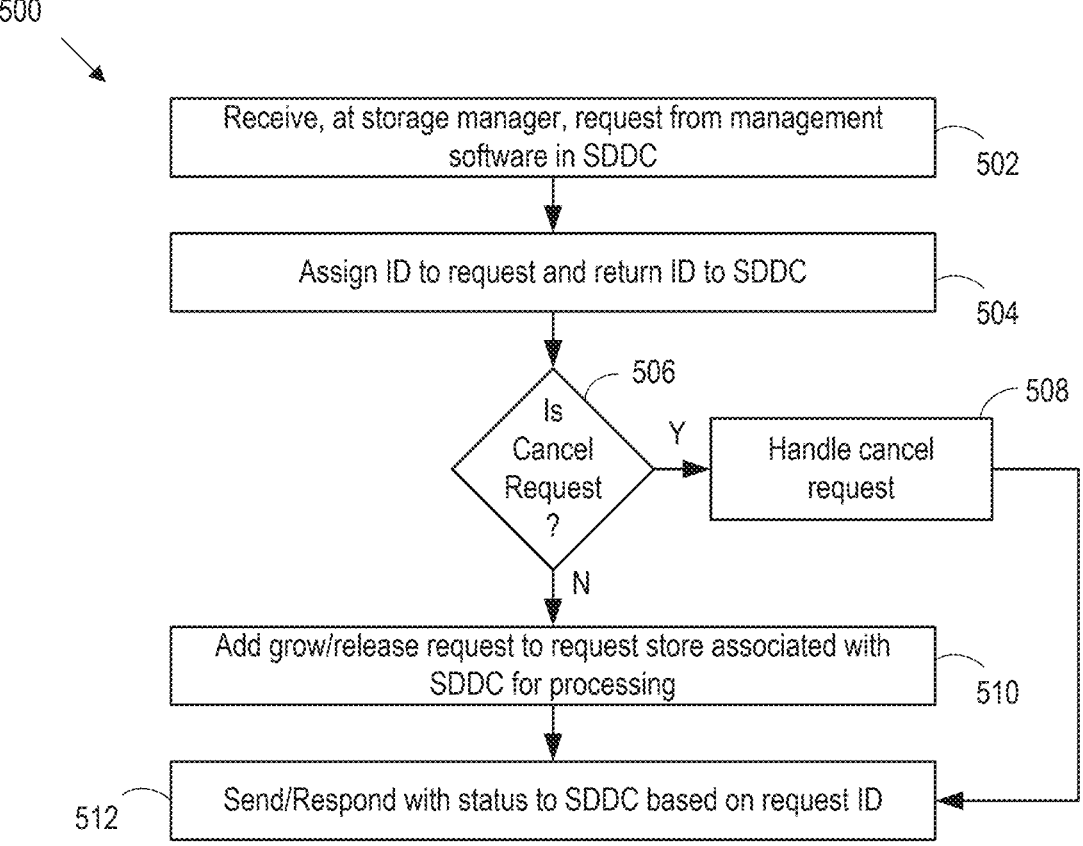
FIG. 5 is a flow diagram depicting a method of processing a request at a storage manager received from management software of an SDDC according to embodiments.

FIG. 5 is a flow diagram depicting a method 500 of processing a request at a storage manager received from management software of an SDDC according to embodiments. Method 500 begins at step 502, where storage manager 112 receives a request from SDDC 104 (e.g., through API 302). At step 504, storage manager 112 assigns an identifier (ID) to the request and returns the ID to SDDC 104. This allows SDDC 104 to track the progress of the request by submitting a status request (through API 302) using the request ID or receiving a status response having the request ID.

At step 506, storage manager 112 determines if the request is a cancel request. If so, method 500 proceeds to step 508, where storage manager 112 handles the cancel request (e.g., via cancel handler 307). A process of handling cancel requests is described below. If at step 506 the request is not a cancel request, method 500 proceeds to step 510. At step 510, storage manager 112 adds a grow request or release request to request store 402 for SDDC 104. Processing of grow requests and release requests that are in request store 402 is described below. Method 500 proceeds to step 512 from both steps 508 and 510. At step 512, storage manager 112 sends status for the request to SDDC 104, or responds to a status request from SDDC 104, based on the request ID. Storage manager 112 can repeat method 500 for each received request.

Figure 6:
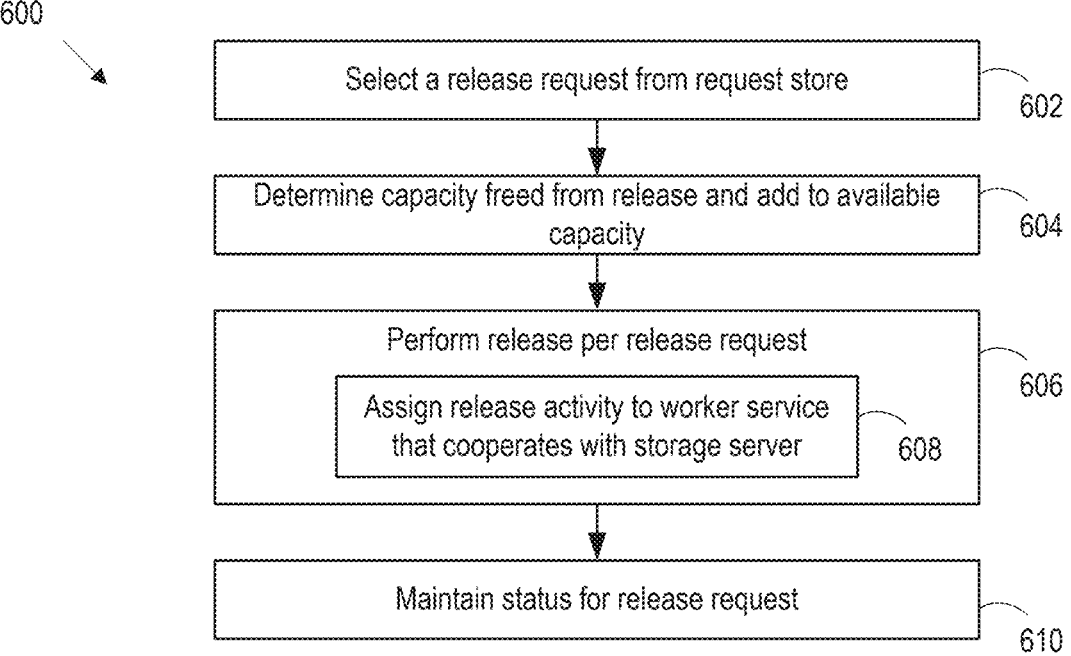
FIG. 6 is a flow diagram depicting a method of handling a release request at a storage manager received from management software of an SDDC according to embodiments.

FIG. 6 is a flow diagram depicting a method 600 of handling a release request at a storage manager received from management software of an SDDC according to embodiments. Method 600 begins at step 602, where storage manager 112 (e.g., using release handler 306) selects a release request from request store 402 for SDDC 104. At step 604, storage manager 112 determines the capacity freed based on the release request and adds that freed capacity to available capacity 404. For example, a release request can be for deletion of a management datastore 312. Storage manager 112 can determine an amount of current capacity 408 that will be freed from the deletion. Storage manager 112 can determine the amount of freed capacity on its own or through cooperation with storage server 308.

At step 606, storage manager 112 cooperates with storage server 308 to perform the release request. For example, at step 608, storage manager 112 can assign a release activity to a worker service 304, which cooperates with storage server 308 to perform the release request. The release activity results in some amount capacity being freed and added to available capacity 404. At step 610, storage manager 112 maintains a status for the release request. The status can have values such as "INIT" for when the request is unprocessed in request store 402, "IN PROGRESS" for when the request is being processed and the release activity is being executed, "SUCCESS" for when the request has been successful, "FAILURE" for when the request has failed, and the like. Storage manager 112 can repeat method 600 for each release request in request store 402.

Figure 7:
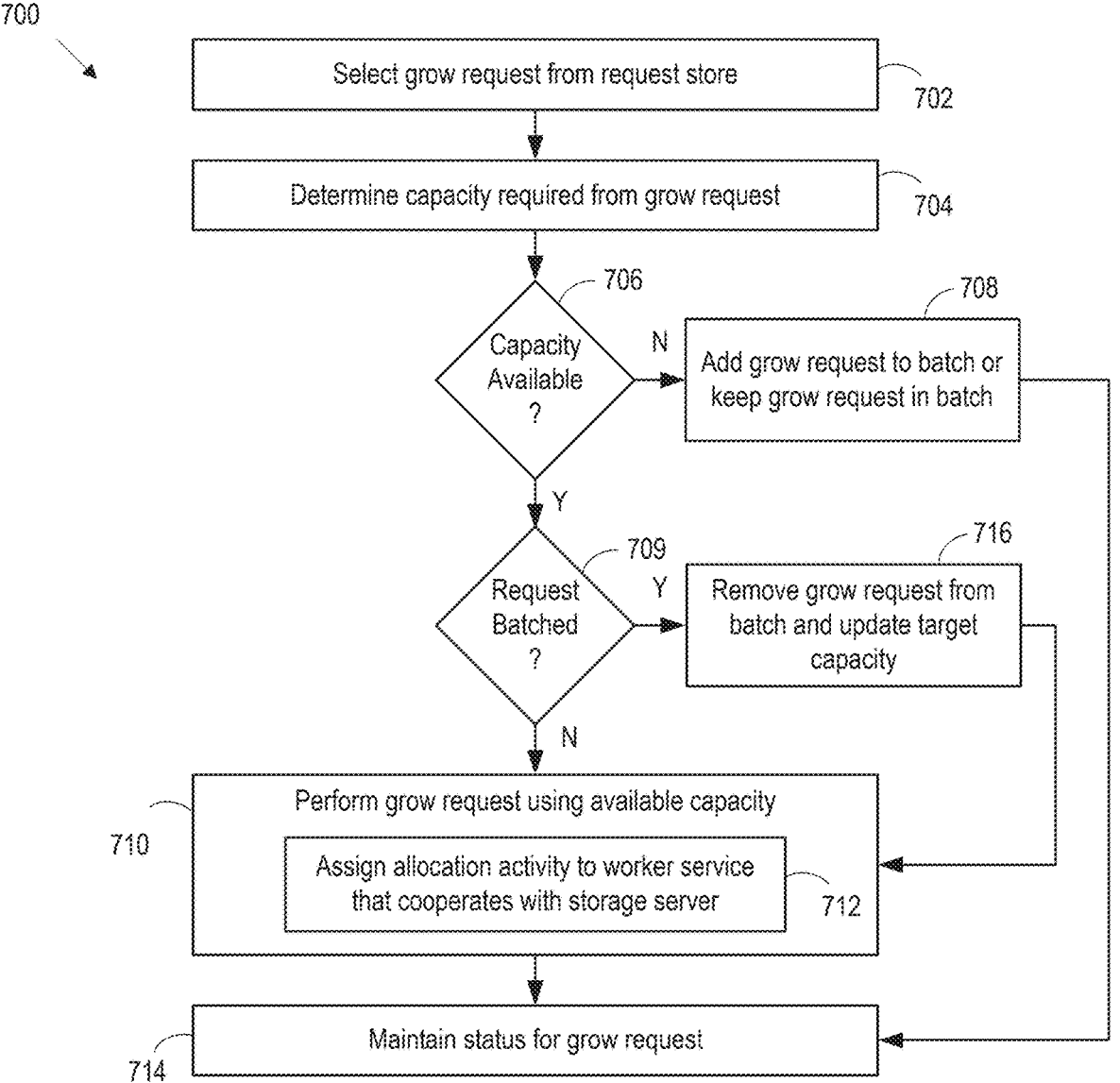
FIG. 7 is a flow diagram depicting a method of handling a grow request at a storage manager received from management software of an SDDC according to embodiments.

FIG. 7 is a flow diagram depicting a method 700 of handling a grow request at a storage manager received from management software of an SDDC according to embodiments. Method 700 begins at step 702, where storage manager 112 (e.g., using grow handler 305) selects a grow request from request store 402 for SDDC 104. At step 704, storage manager 112 determines an amount of capacity to be consumed by the request. For example, the grow request can be for a management datastore 312 having a certain size.

At step 706, storage manager 112 determines if the capacity needed by the grow request is available as determined from available capacity 404. If at step 706 there is insufficient capacity available for the grow request, method 700 proceeds to step 708. At step 708, storage manager 112 adds the grow request to a batch and updates the target capacity (e.g., add the capacity needed by the grow request to the expanded capacity). If the grow request was previously added to the batch, storage manager 112 keeps the grow request in the batch (without updating the target capacity). The process for growing the current capacity of the subscription based on target capacity 406 is described below.

If at step 706 the capacity needed by the grow request is available, method 700 proceeds to step 709. At step 709, storage manager 112 determines if the grow request has already been batched. If so, method 700 proceeds to step 716, where storage manager 112 removes the grow request from the batch and updates the target capacity (e.g., removes the capacity needed by the grow request from the expanded capacity). Method 700 proceeds from step 716 to step 710. If the request is not batched at step 709, method 700 proceeds to step 710.

At step 710, storage manager 112 performs the grow request using available capacity 404. For example, at step 712, storage manager 112 can assign an allocation activity to a worker service 304. Worker service 304 can cooperate with storage server 308 to allocate a management datastore 312 and/or volume 310 based on the grow request. In the case where there is available capacity for the grow request, expansion of the current capacity is not needed and is thus not performed. Rather, the grow request is serviced from the available capacity.

Method 700 proceeds to step 714 from steps 708 and 710. At step 714, storage manager 112 maintains a status for the grow request. The status can have values such as "INIT" for when the request is unprocessed in request store 402, "IN PROGRESS" for when the request is being processed and the release activity is being executed, "SUCCESS" for when the request has been successful, "FAILURE" for when the request has failed, and the like. Storage manager 112 can repeat method 700 for each grow request in request store 402. A grow request in request store 402 can be processed multiple times. If a grow request is batched, but later on capacity becomes available from a release request, then the grow request can be removed from the batch and serviced from the available capacity. As described below, a batch of grow requests is processed when the cool-off period expires.

Storage manager 112 can select requests to process from request store 402 depending on the type of data structure that implements request store 402. For example, in an embodiment request store 402 is a queue. Storage manager 112 selects the request at the top of the queue to process and performs either method 600 if the request is a release request or method 700 if the request is a grow request. Requests remain in request store 402 until obtaining a final status (e.g., SUCCESS, FAILURE, CANCELLED).

Figure 8:
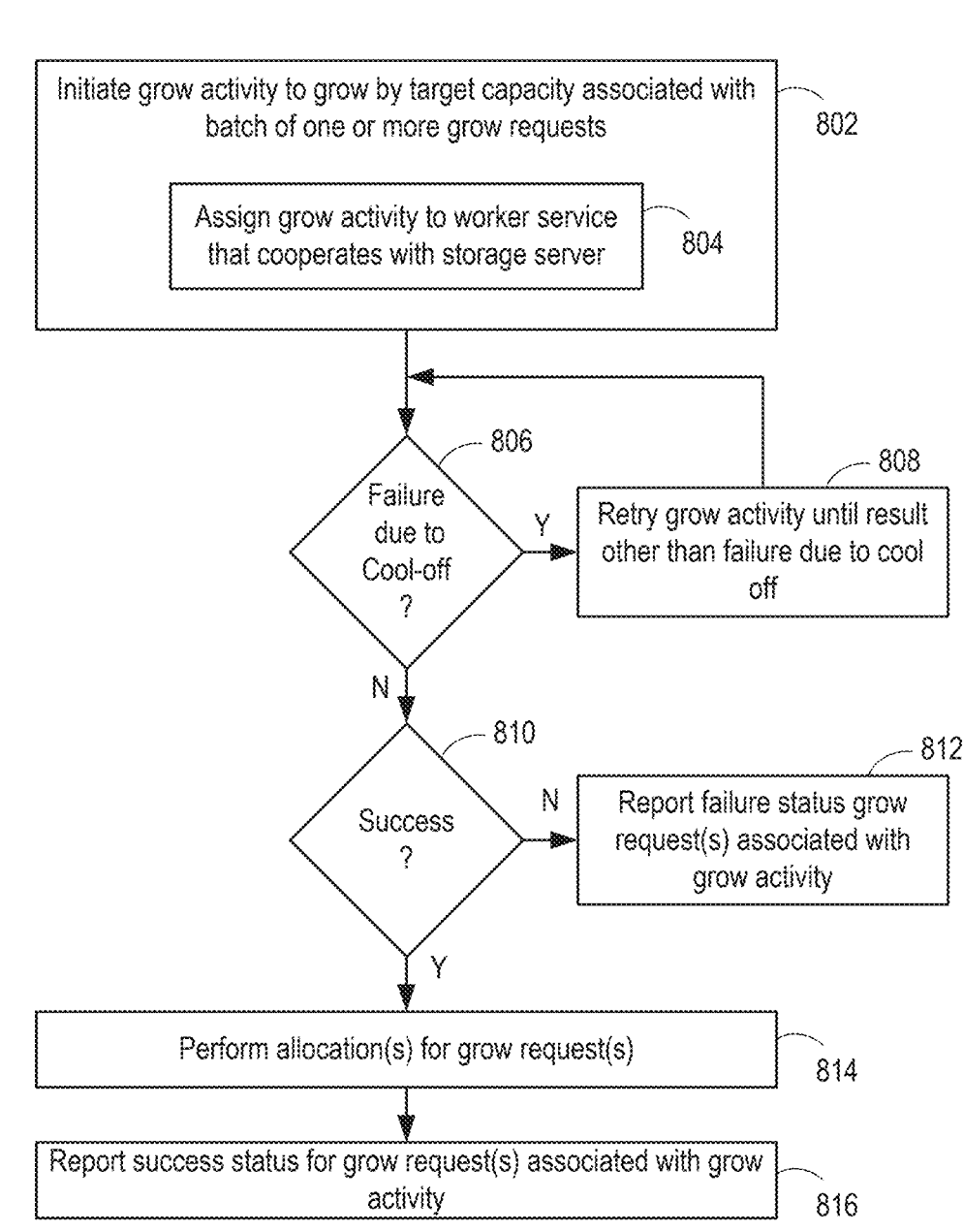
FIG. 8 is a flow diagram depicting a method of performing a grow activity to grow capacity according to embodiments.

FIG. 8 is a flow diagram depicting a method 800 of performing a grow activity to grow capacity according to embodiments. Method 800 begins at step 802, where storage manager 112 initiates a grow activity to grow current capacity 408 of the subscription to achieve target capacity 406 that has been determined by processing one or more grow requests (FIG. 7). For example, at step 804, storage manager 112 can assign the grow activity to a worker service 304 that cooperates with storage server 308 to expand the current capacity of the subscription based on the target capacity. At step 806, storage manager 112 determines if the grow activity has failed due to the cool-off period being active. If the cool-off period is active, storage server 308 will not perform a further expansion of the current capacity for the subscription (since a prior expansion is still being performed). In such case, method 800 proceeds to step 808, where storage manager 112 retries the grow activity until the result is other than failure due to the cool-off period being active. Storage manager 112 can retry the grow activity periodically after a timeout period, for example. During the active cool-off period, storage manager 112 can continue to handle grow requests as described above with respect to FIG. 7. Thus, target capacity 406 can increase as additional grow requests are processed during the cool-off period. If grow requests are removed from the batch due to new available capacity, target capacity 406 can decrease during the cool-off period. As such, storage manager 112 batches grow requests received during the cool-off period.

If at step 806 there is no failure due to the cool-off period being active, method 800 proceeds to step 810. At step 810, storage manager 112 determines if the grow activity has succeeded. If not, method 800 proceeds to step 812, where storage manager 112 reports a failure status for each grow request associated with the current grow activity (e.g., each grow request in the batch). If the grow activity is successful, method 800 proceeds to step 814. At step 814, storage manager 112 can cooperate with storage server 308 to perform any allocation(s) for the grow request(s) (e.g., allocation(s) of volume(s) 310 and/or management datastore (s) 312). At step 816, storage manager 112 reports success status for each grow request associated with the grow activity (e.g., each grow request in the batch).

Storage manager 112 performs method 800 concurrently with methods 500-700 described above. That is, storage manager 112 can initiate a grow activity that is stalled due to the cool off period being active. While the grow activity is pending, storage manager 112 continues to receive requests and handle both the release requests and the grow requests in request store 402. While the grow activity is pending, some grow requests can be serviced from the available capacity, while others cannot and result in the increase of the target capacity for the pending grow activity.

Figure 9:
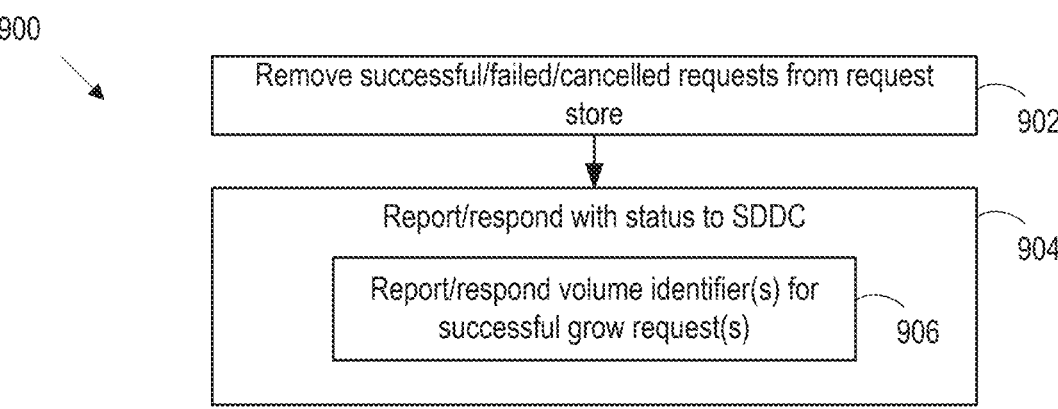
FIG. 9 is a flow diagram depicting a method of managing a request store according to embodiments.

FIG. 9 is a flow diagram depicting a method 900 of managing a request store according to embodiments. Method 900 begins at step 902, where storage manager 112 removes successful, failed, and cancelled requests from request store 402. Requests that have not been processed (e.g., "INIT" status) or that are pending (e.g., "IN PROGRESS" status) remain in request store 402. At step 904, storage manager 112 reports status to SDDC 104 or responds to status requests from SDDC 104. For example, at step 906, storage manager 112 can report status, or respond to a status request, with volume ID(s) for successful grow request(s). This allows SDDC to mount the volume(s) for use by management software 114.

Figure 10:
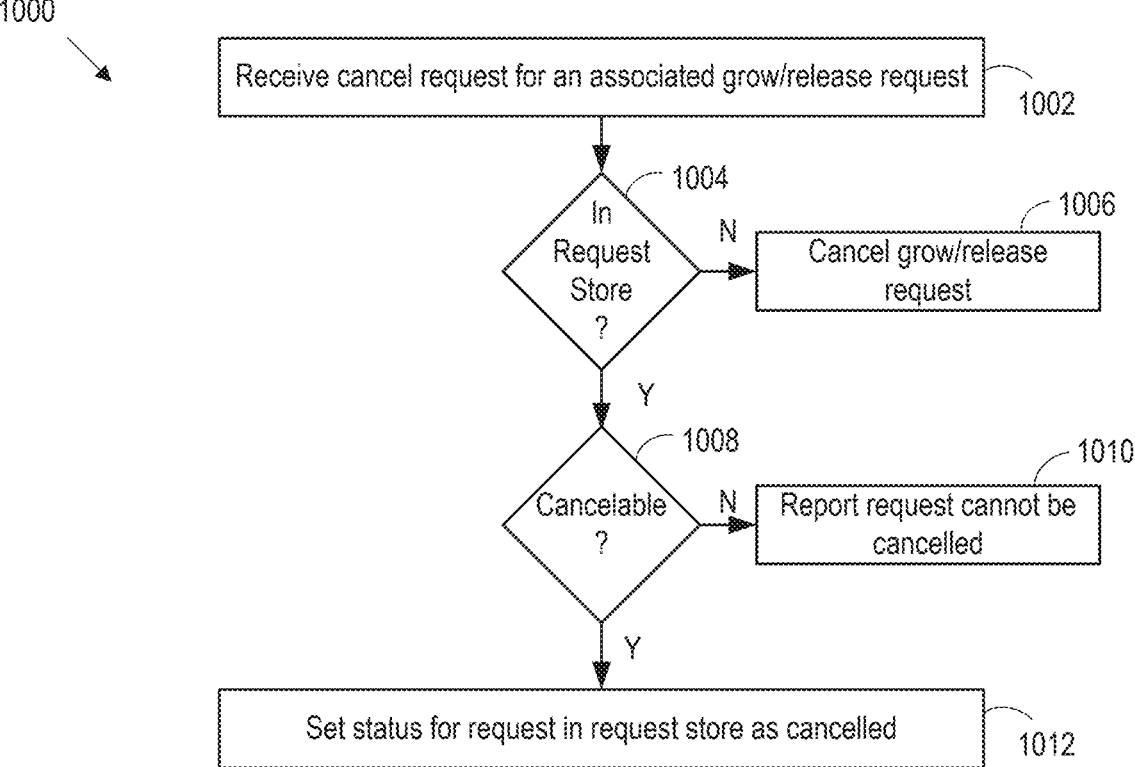
FIG. 10 is a flow diagram depicting a method of handling a cancel request at a storage manager according to embodiments.

FIG. 10 is a flow diagram depicting a method 1000 of handling a cancel request at a storage manager according to embodiments. Method 1000 begins at step 1002, where storage manager 112 (e.g., using cancel handler 307) receives a cancel request for an associated grow/release request. At step 1004, storage manager 112 determines if the grow/release request is in a request store for the SDDC. If not, method 1000 proceeds to step 1006, where storage manager 112 cancels the grow/release request. That is, the cancel request can be received before the grow/release request is stored in the request store. In such case, the grow/release request is cancelled and not entered into the request store for processing.

If the grow/release request is in a request store, method 1000 proceeds from step 1004 to step 1008. At step 1008, storage manager 112 determines if the grow/release request is cancelable. For example, a grow/release request with a status indicating the request is unprocessed (e.g., "INIT" status) can be cancelled. However, a grow/release request with a status indicating "SUCCESS" or "FAILURE" has already been performed and cannot be canceled. Requests with an "IN PROGRESS" status may or may not be cancelable depending on the state of their associated activities. For example, a release request or grow request may be in progress by storage server 308 and thus not cancelable. However, a grow request that has been processed and set to IN PROGRESS may have a grow activity that is pending expiration of the cool off period. In such case, the grow request can be cancelled and the target capacity adjusted. If at step 1008 the request is not cancelable, method 1000 proceeds to step 1010, where storage manager 112 reports that the request cannot be cancelled. If at step 1008 the request can be cancelled, method 1000 proceeds to step 1012, where storage manager 112 sets the status for the request as "CANCELLED" and can report the cancelation to the SDDC.

Techniques for managing external storage for an SDDC executing in a cloud have been described. A customer may obtain a cloud subscription having diskless hosts (e.g., to save costs). The customer may also deploy an SDDC on the diskless hosts. The SDDC include management software that requires storage for persistent data. Since the diskless hosts do not have usable local storage devices, the management software of the SDDC cannot leverage such storage devices for its persistent storage needs. A technical problem exists in that the customer cannot deploy an SDDC on a subscription having diskless hosts. The embodiments described herein provide a technical solution to such a technical problem in that the SDDC is configured to use cloud-based storage accessible over its network (external to the hosts). Another technical problem exists in that the storage capacity required by the management software can vary over time. The embodiments described herein provide a technical solution to such a technical problem by providing a storage manager that batches requests for capacity from the SDDC and obtains such capacity on demand over time. The technical solutions described herein provide technical improvements, including saving storage resources in the cloud, improvement of computer functionality (e.g., storage that is not wasted can be used by other resources in the cloud, improving the functionality of the cloud).

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that these embodiments may also apply to other examples of contexts, such as containers. Containers implement operating system—level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in userspace on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. In some cases, if and where relevant, "virtualized computing instance" can encompass both VMs and containers.

Although one or more embodiments have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A computing system, comprising:
a software-defined data center (SDDC) configured to execute in a cloud;
external storage in the cloud accessible by the SDDC over a network; and a storage manager executing in the cloud and configured to:

receive, from the SDDC, requests to consume capacity of the external storage, the external storage allocated for the SDDC according to a subscription to the cloud;

determine, based on a batch of the requests in combination, an amount by which to expand a current capacity of the external storage to a target capacity comprising a sum of an expanded capacity and the current capacity;

execute, in cooperation with a storage server of the external storage, a first activity to obtain the target capacity of the external storage;

retry, in cooperation with the storage server, the first activity to obtain the target capacity in response to failure due to a cool-off period applied to the subscription; and send, to the SDDC, at least one identifier that enables software executing in the SDDC to use the expanded capacity for the batch of requests.

2. The computing system of claim 1, wherein the SDDC is configured to execute on diskless hosts of the cloud, and wherein the external storage comprises storage devices external to the diskless hosts.

3. The computing system of claim 1, wherein the storage manager is configured to receive the requests from the SDDC during the cool-off period applied to the subscription by the external storage, the storage server configured to reject change to the current capacity during the cool-off period.

4. The computing system of claim 3, wherein the storage manager is configured to cooperate with the storage server to attempt execution of the first activity over a plurality of attempts during the cool-off period, and wherein the first activity is executed after expiration of the cool-off period.

5. The computing system of claim 1, wherein the storage manager is configured to maintain an available capacity of the external storage, the available capacity being a free portion of the current capacity, and wherein the storage manager is configured to:

receive, from the SDDC, a release request to release capacity of the external storage from use by the software of the SDDC; and add an amount of capacity identified by the release request to the available capacity.

6. A method of managing external storage for a software-defined data center (SDDC) executing in a cloud, comprising:

receiving, at a storage manager executing in the cloud from the SDDC, requests to consume capacity of the external storage, the external storage allocated for the SDDC according to a subscription to the cloud;

determining, by the storage manager based on a batch of the requests in combination, an amount by which to expand a current capacity of the external storage to a target capacity comprising a sum of an expanded capacity and the current capacity;

executing, by the storage manager in cooperation with a storage server of the external storage, a first activity to obtain the target capacity of the external storage;

detecting a failure due to a cool-off period applied to the subscription, and in response to detecting the failure, retrying, in cooperation with the storage server, the first activity to obtain the target capacity; and sending, from the storage manager to the SDDC, at least one identifier that enables software executing in the SDDC to use the expanded capacity for the batch of the requests.

7. The method of claim 6, wherein the SDDC executes on diskless hosts of the cloud, and wherein the external storage comprises storage devices external to the diskless hosts.

8. The method of claim 6, wherein the storage manager receives the requests from the SDDC during the cool-off period applied to the subscription by the external storage, the method further comprising:

rejecting, by the storage server, change to the current capacity during the cool-off period.

9. The method of claim 8, wherein the step of executing comprises:

attempting, by the storage manager in cooperation with the storage server, execution of the first activity over a plurality of attempts during the cool-off period;

wherein the first activity is executed after expiration of the cool-off period.

10. The method of claim 6, further comprising:

determining, by the storage manager, available capacity of the external storage that satisfies a first request of the requests, the available capacity being a free portion of the current capacity; and sending, from the storage manager to the SDDC, an identifier that enables the software executing in the SDDC to use the available capacity for the first request; and wherein the first request is excluded from the batch of the requests.

11. The method of claim 6, wherein the method further comprises:

maintaining, by the storage manager, an available capacity of the external storage, the available capacity being a free portion of the current capacity;

receiving, at the storage manager executing in the cloud from the SDDC, a release request to release capacity of the external storage from use by the software of the SDDC; and adding an amount of capacity identified by the release request to the available capacity.

12. The method of claim 11, further comprising:

determining, by the storage manager, the available capacity of the external storage satisfies a first request of the requests in the batch;

sending, from the storage manager to the SDDC, an identifier that enables the software executing in the SDDC to use the available capacity for the first request;

removing the first request from the batch of requests prior to expiration of a cool-off period applied to the subscription by the external storage, the storage server rejecting change to the current capacity during the cool-off period; and updating the target capacity based on removal of the first request from the batch of requests.

13. The method of claim 6, further comprising:

receiving, at the storage manager executing in the cloud from the SDDC, a request to cancel a first request of the requests;

determining, by the storage manager, that the first request is cancelable;

removing, by the storage manager in response to the first request being cancelable, the first request from the batch of requests; and updating the target capacity based on removal of the first request from the batch of requests.

14. The method of claim 6, wherein the software executing in the SDDC comprises management software that manages virtualization of hosts and network of the cloud to implement the SDDC.

15. A non-transitory computer readable medium comprising instructions to be executed in a computing device to cause the computing device to carry out a method of managing external storage for a software-defined data center (SDDC) executing in a cloud, comprising:

receiving, at a storage manager executing in the cloud from the SDDC, requests to consume capacity of the external storage, the external storage allocated for the SDDC according to a subscription to the cloud;

determining, by the storage manager based on a batch of the requests in combination, an amount by which to expand a current capacity of the external storage to a target capacity comprising a sum of an expanded capacity and the current capacity;

executing, by the storage manager in cooperation with a storage server of the external storage, a first activity to obtain the target capacity of the external storage;

retrying, in cooperation with the storage server, the first activity to obtain the target capacity in response to failure due to a cool-off period applied to the subscription; and sending, from the storage manager to the SDDC, at least one identifier that enables software executing in the SDDC to use the expanded capacity for the batch of the requests.

16. The non-transitory computer readable medium of claim 15, wherein the SDDC executes on diskless hosts of the cloud, and wherein the external storage comprises storage devices external to the diskless hosts.

17. The non-transitory computer readable medium of claim 15, wherein the storage manager receives the requests from the SDDC during the cool-off period applied to the subscription by the external storage, the method further comprising:

rejecting, by the storage server, change to the current capacity during the cool-off period.

18. The non-transitory computer readable medium of claim 17, further comprising:

determining, by the storage manager, available capacity of the external storage that satisfies a first request of the requests, the available capacity being a free portion of the current capacity; and sending, from the storage manager to the SDDC, an identifier that enables the software executing in the SDDC to use the available capacity for the first request; and wherein the first request is excluded from the batch of the requests.

19. The non-transitory computer readable medium of claim 10, wherein the method further comprises:

maintaining, by the storage manager, an available capacity of the external storage, the available capacity being a free portion of the current capacity;

receiving, at the storage manager executing in the cloud from the SDDC, a release request to release capacity of the external storage from use by the software of the SDDC; and adding an amount of capacity identified by the release request to the available capacity.

20. The non-transitory computer readable medium of claim 19, further comprising:

determining, by the storage manager, the available capacity of the external storage satisfies a first request of the requests in the batch;

sending, from the storage manager to the SDDC, an identifier that enables the software executing in the SDDC to use the available capacity for the first request;

removing the first request from the batch of requests prior to expiration of a cool-off period applied to the subscription by the external storage, the storage server rejecting change to the current capacity during the cool-off period; and updating the target capacity based on removal of the first request from the batch of the requests.

* * * * *